US012810902B2

(12) United States Patent
Hayashi et al.

(10) Patent No.: US 12,810,902 B2
(45) Date of Patent: Nov. 24, 2026

(54) VIDEO EDITING DEVICE, VIDEO EDITING PROGRAM, AND VIDEO EDITING METHOD

(71) Applicant: UNIXON SYSTEMS CO., LTD., Fukuoka (JP)

(72) Inventors: Erika Hayashi, Fukuoka (JP); Fumihiko Kimura, Fukuoka (JP)

(73) Assignee: UNIXON SYSTEMS CO., LTD., Fukuoka (JP)

( * ) Notice: Subject to any disclaimer, the term of this patent is extended or adjusted under 35 U.S.C. 154(b) by 180 days.

(21) Appl. No.: 18/863,646

(22) PCT Filed: Jul. 26, 2023

(86) PCT No.: PCT/JP2023/027364
§ 371 (c)(1),
(2) Date: Nov. 7, 2024

(87) PCT Pub. No.: WO2024/034401
PCT Pub. Date: Feb. 15, 2024

(65) Prior Publication Data

US 2026/0260666 A1 Sep. 3, 2026

(30) Foreign Application Priority Data

Aug. 10, 2022 (JP) ................................ 2022-127691

(51) Int. Cl.
*G11B 27/036* (2006.01)
*G06F 40/268* (2020.01)
(Continued)

(52) U.S. Cl.
CPC .......... *G11B 27/036* (2013.01); *G06F 40/268* (2020.01); *G06V 10/26* (2022.01);
(Continued)

(58) Field of Classification Search
CPC ..... G11B 27/036; G06F 40/268; G06V 10/26; G06V 10/56; G06V 10/764; G06V 20/41;
(Continued)

(56) References Cited

U.S. PATENT DOCUMENTS 11,830,241 B2 * 11/2023 Merler .................. G06N 20/00
2011/0044549 A1 * 2/2011 Bressan .............. G11B 27/034 382/225
2016/0004911 A1 * 1/2016 Cheng .................... G06F 16/43 382/159

FOREIGN PATENT DOCUMENTS

EP 1765011 3/2007
JP 2002335473 11/2002
(Continued)

OTHER PUBLICATIONS

"International Search Report (Form PCT/ISA/210) of PCT/JP2023/027364", mailed on Oct. 17, 2023, with English translation thereof, pp. 1-4.

*Primary Examiner* — Loi H Tran
(74) *Attorney, Agent, or Firm* — JCIPRNET

(57) ABSTRACT

An object is to provide a video editing device, a video editing program, and a video editing method capable of efficiently creating a digest video obtained by collecting scenes in which a viewer will show interest. The video editing device 1 divides video content serving as an original material into cut videos made up of a plurality of frame images on the basis of a predetermined condition. The divided cut videos are classified into scenes of the video content classified in advance, cut videos that will leave an impression on the viewers are extracted, and the extracted cut videos are connected to create a digest video having a shorter time length than the video content.

12 Claims, 8 Drawing Sheets

(51) Int. Cl.

| | |
|---|---|
| ***G06V 10/26*** | (2022.01) |
| ***G06V 10/56*** | (2022.01) |
| ***G06V 10/764*** | (2022.01) |
| ***G06V 20/40*** | (2022.01) |
| ***G06V 20/62*** | (2022.01) |
| ***G06V 30/19*** | (2022.01) |
| ***G10L 25/57*** | (2013.01) |

(52) U.S. Cl.
CPC ............ *G06V 10/56* (2022.01); *G06V 10/764* (2022.01); *G06V 20/41* (2022.01); *G06V 20/47* (2022.01); *G06V 20/49* (2022.01); *G06V 20/63* (2022.01); *G06V 30/19* (2022.01); *G10L 25/57* (2013.01)

(58) Field of Classification Search
CPC ........ G06V 20/47; G06V 20/49; G06V 20/63; G06V 30/19; G10L 25/57
USPC .......................................................... 386/278
See application file for complete search history.

(56) References Cited

FOREIGN PATENT DOCUMENTS

| | | |
|---|---|---|
| JP | 2011135126 | 7/2011 |
| JP | 2012248987 | 12/2012 |
| JP | 2016035607 | 3/2016 |
| JP | 2018206292 | 12/2018 |

* cited by examiner

| 10 minutes (longer highlights) | 5 minutes (shorter highlights) | 3 minutes (more scoring scenes) | 3 minutes (scoring scenes only) |
|---|---|---|---|
| Opening | Opening | Scoring scene 1 | Scoring scene 1 |
| Player introduction | Scoring scene 1 | Scoring scene 2 | Scoring scene 2 |
| Scoring scene 1 | State of spectators | State of spectators | Scoring scene 3 |
| State of spectators | Scoring scene 2 | Player-of-the-game interview | Scoring scene 4 |
| Scoring scene 2 | Player-of-the-game interview | | |
| Player-of-the-game interview | | | |

FIG. 8

VIDEO EDITING DEVICE, VIDEO EDITING PROGRAM, AND VIDEO EDITING METHOD

CROSS-REFERENCE TO RELATED APPLICATION

This application is a 371 application of the international PCT application serial no. PCT/JP2023/027364, filed on Jul. 26, 2023, which claims the priority benefit of Japan application no. 2022-127691, filed on Aug. 10, 2022. The entirety of each of the above-mentioned patent applications is hereby incorporated by reference herein and made a part of this specification.

TECHNICAL FIELD

The present invention relates to a video editing device, a video editing program, and a video editing method. Specifically, the present invention relates to a video editing device, a video editing program, and a video editing method capable of efficiently creating a digest video obtained by collecting scenes in which a viewer will show interest.

RELATED ART

With a program of television broadcasting that is broadcasted for a long duration, such as a sports game, a movie, or television shopping, the viewers have to take time off their living other than viewing the program, they may not have time to view the long-duration program from the beginning to the end, and there is a need for viewing a digest program edited to include only the points of the program. Conventionally, in general, a video editor at a broadcast station creates a digest video by manually selecting only the scenes in which the viewers are considered to show interest in a long-duration program and editing the selected scenes so as to fall within a predetermined broadcast time frame.

However, in a case where a digest video is manually edited in this manner, a program that needs to be made into a digest video has a relatively long time range, and it takes a significant time and effort to select scenes to be the points from the program, causing a large workload for the video editor. Furthermore, since the digest video created in this manner is a digest including points selected from the viewpoint of the video editor, there is a problem where the digest video does not necessarily reflect the interest of the viewers.

In view of the problems described above, there is a technique disclosed in Patent Literature 1 as a technique for efficiently creating a digest video. According to the technical content disclosed in Patent Literature 1, the motion status of another viewer is analyzed, a degree of attention to a scene in a program is calculated on the basis of interest information of the viewer, scenes with a high degree of attention of the viewer are selected from the video, and the selected scenes are connected to create a digest video. This allows for efficient creation of a digest video that reflects the interest of the viewer.

CITATION LIST

Patent Literature

Patent Literature 1: Japanese Laid-open No. 2012-248987

SUMMARY OF INVENTION

Problem to be Solved by Invention

However, merely viewing scenes to which other viewers have paid attention may create a digest video that does not take into account the context of content or the context between scenes, and it may be difficult to understand the content. For example, in a sports relay broadcast, a scoring scene tends to have a high degree of attention, but even if a digest video is edited by adopting only scoring scenes, the connection between preceding and following videos may be unnatural, and there is a possibility that a viewer cannot sufficiently understand the game content.

The present invention has been made in view of the above-described points, and an object thereof is to provide a video editing device, a video editing program, and a video editing method capable of efficiently creating a digest video obtained by collecting scenes in which a viewer will show interest.

Means for Solving Problem

To achieve the above-described object, a video editing device according to the present invention includes: an image analysis unit configured to perform image analysis of video content serving as an original material; a cut video creation unit configured to create cut videos by dividing the video content at a predetermined division point on a basis of an analysis result of the image analysis unit; a cut video selection unit configured to select desired cut videos from the cut videos on the basis of the analysis result of the image analysis unit; and a digest video creation unit configured to create a digest video that has a shorter video time length than the video content by connecting the cut videos selected by the cut video selection unit.

Here, by including the image analysis unit that performs image analysis of the video content serving as the original material, it is possible to extract characteristic images to be adopted as the digest video from the video content serving as the original material by performing image analysis of the video content.

Also, by including the cut video creation unit that creates cut videos by dividing the video content on the basis of the analysis result of the image analysis unit, it is possible to divide the video content into a plurality of cut videos. Then, by connecting desired cut videos from the divided cut videos, it is possible to edit a digest video that allows easily imagining the entire original video and will not give a sense of incongruity.

Furthermore, by including the cut video selection unit that selects a desired cut video from a plurality of cut videos on the basis of the analysis result of the image analysis unit, it is possible to preferentially adopt a cut video that will give a favorable impression to the viewers, such as a cut video having a favorable expression of a performer (presenter, competitor, commentator, and the like) of the video content or a cut video in which a performer makes remarks that will leave an impression, among the cut videos included in the scene video, and edit a video that will leave an impression on the viewers.

Furthermore, by including the digest video creation unit that creates a digest video that has a shorter video time length than the video content by connecting the cut videos selected by the cut video selection unit, the digest video is edited on the basis of the selected characteristic cut videos. It is thus possible to edit a video that is likely to leave an impression on the viewer in a short-time video and will not give a sense of incongruity.

Furthermore, by including a scene video creation unit configured to create scene videos by classifying the cut videos into a plurality of attribute groups that are prepared in advance, it is possible to sort the cut videos into the attribute groups classified in advance on the basis of the video content and create one scene video. That is, the video content is classified into a plurality of scene videos, and scene videos are selected according to the purpose of the digest video to be edited, so that the connection between the preceding and following scene videos is natural, and it is possible to edit a digest video without a sense of incongruity.

Furthermore, by including a scene video evaluation unit configured to evaluate the scene videos by setting a desired score for each of the scene videos, it is possible to identify a scene video that will leave an impression on the viewer by assigning a score to each scene video using, for example, the audience rating, the number of inquiries from the viewers, and the like as parameters, among the scene videos classified into the plurality of attribute groups.

Furthermore, by including a scene video selection unit configured to select a desired scene video from the scene videos on a basis of the scores set by the scene video evaluation unit, it is possible to preferentially select a scene video that is considered to draw a high degree of attention from the viewer on the basis of the evaluation result of the scene video evaluation unit described above, and it is thus possible to edit a video that is likely to leave an impression on the viewers.

Furthermore, in a case where the image analysis unit includes: a color change amount calculation unit configured to calculate a color change amount between frame images of the video content; a text data extraction unit configured to recognize audio data included in the video content and extract the audio data as text data; and an OCR analysis unit configured to extract character information included in the video content, and the cut video creation unit is configured to set a division point for dividing the video content on a time axis using at least one or more parameters of the color change amount, the text data, and the character information as a feature amount, it is possible to accurately determine the division point of the video content, and the digest video that is edited by connecting cut videos can be edited into a video that will not give a sense of incongruity.

For example, in a case where the color change amount in preceding and following frame images is large, it is estimated that the video scene has been switched, and a point where the color change amount greatly changes can be set as the division point of cut videos. Furthermore, on the basis of the text data obtained by recognizing the audio data and converting the audio data into text, the division point of cut videos can be set on the basis of the conjunction or context. Furthermore, character information displayed on a flip chart displayed in the video content can be extracted by OCR processing, and a point at which the character information changes can be set as a division point of cut videos. The scene switching is comprehensively determined on the basis of the three parameters of the color change amount, the text data, and the character information, so that the division point that allows cut videos to be more accurately extracted can be set.

Furthermore, in a case where the color change amount calculation unit includes: an RGB change amount calculation unit configured to divide representative frame images that are temporally preceding and following in the video content into a plurality of image regions and calculate an RGB change amount of a pixel in each image region of the representative frame images; and a hue shift average calculation unit configured to calculate a hue shift average in predetermined adjacent hue regions on a color circle for the representative frame images, and the color change amount calculation unit is configured to calculate the color change amount on a basis of the RGB change amount and the hue shift average, a color change is determined on the basis of at least two parameters of the RGB change amount and the hue shift average. Thus, erroneous detection of the division point can be prevented, the division point can be reliably detected, and a video without a sense of incongruity can be edited.

Furthermore, in a case where the image analysis unit further includes: a morphological analysis unit configured to perform morphological analysis on the text data extracted by the text data extraction unit for each word; and an object detection unit configured to detect a desired object displayed in the video content, and the scene video creation unit is configured to classify the cut video into one of the plurality of attribute groups on a basis of at least one of commonality of context based on morphological analysis by the morphological analysis unit, commonality of character information based on OCR analysis by the OCR analysis unit, and presence or absence of movement of an object based on object detection by the object detection unit, the cut videos can be accurately classified into the attributes of the scene videos that are classified in advance on the basis of each element of the character information according to the text data based on the morphological analysis, object detection, and OCR analysis.

Furthermore, in a case where a plurality of content sections corresponding to a program configuration of the video content, including an opening section indicating content of an opening portion of the video content, are stored as the attribute groups, and the scene video creation unit is configured to classify the cut video into one of the plurality of content sections on a basis of content of the cut video, the cut videos can be classified into content sections corresponding to the program configuration of the video content to form a group of scene videos.

Furthermore, in a case where the scene video evaluation unit is configured to set a score for each scene video by weighting according to a predetermined parameter indicating a degree of attention from a viewer in each scene video of the video content and a time segment corresponding to a prearranged program configuration of the video content, a video can be edited in which scene videos to which viewers will pay attention are preferentially adopted among a plurality of scene videos by assigning a score to each scene video using, for example, the audience rating, the viewer's reaction, and the like as parameters.

Furthermore, in a case where the image analysis unit further includes: a sound volume level detection unit configured to detect a sound volume level of the video content; and an expression detection unit configured to detect an expression of a performer of the video content, and the cut video selection unit is configured to select a desired cut video from a content section in which a sound volume of the video content detected by the sound volume level detection unit exceeds a predetermined threshold, a content section in which an expression of a performer of the video content detected by the expression detection unit is in a specific state, or a content section in which a performer of the video content utters a specific term on a basis of text data extracted by the text data extraction unit, a video can be edited in which a cut video having the best appearance for the viewers is preferentially adopted from a plurality of cut videos classified into desired scene videos.

In order to achieve the above-described object, a video editing program according to the present invention is for causing a computer to execute the steps of: creating cut videos by dividing video content serving as an original material on a basis of a predetermined division condition; creating scene videos by classifying the cut videos into a plurality of attribute groups prepared in advance; evaluating the scene videos by setting a desired score for each of the scene videos; selecting a desired scene video from the scene videos on a basis of the scores; selecting desired cut videos from a plurality of the cut videos included in the scene video; and creating a digest video having a shorter video time length than the video content by connecting the cut videos selected in the step of selecting the cut videos.

Here, by including the step of creating cut videos by dividing video content serving as an original material on a basis of a predetermined division condition, it is possible to divide the video content into a plurality of cut videos. Then, by connecting desired cut videos from the divided cut videos, it is possible to edit a video that allows easily imagining the entire original video and will not give a sense of incongruity.

Furthermore, by including the step of creating scene videos by classifying the cut videos into a plurality of attribute groups prepared in advance, it is possible to sort the cut videos into the attribute groups classified in advance on the basis of the video content and create one scene video.

Furthermore, by including the step of evaluating the scene videos by setting a desired score for each of the scene videos, it is possible to identify a scene video with a high degree of attention from the viewers by assigning a score to each scene video using, for example, the audience rating, viewer's reaction, and the like as parameters, among the scene videos classified into the plurality of attribute groups.

Furthermore, by including the step of selecting a desired scene video from the scene videos on the basis of the scores set in the step of evaluating the scene videos, it is possible to adopt a video that will give a good impression to the viewers by preferentially selecting a scene video that is considered to have a high attention degree from the viewers on the basis of the evaluation result of the scene videos described above.

Furthermore, by including the step of selecting desired cut videos from the scene video on the basis of the scores, it is possible to preferentially adopt a cut video that will give a favorable impression to the viewers, by selecting from the cut videos included in the scene video a cut video having a favorable expression of a performer, or a cut video in which a performer makes remarks that will leave an impression, and edit a video that will leave an impression on the viewers.

Furthermore, by including the step of creating a digest video having a shorter video time length than the video content by connecting the cut videos selected in the step of selecting the cut videos, the digest video is edited on the basis of the selected characteristic cut videos. It is thus possible to edit a video that is likely to leave an impression on the viewer in a short-time video and will not give a sense of incongruity.

Furthermore, in a case where the step of creating the cut videos includes the steps of: calculating a color change amount between frame images of the video content; recognizing audio data included in the video content and extracting the audio data as text data; extracting character information included in the video content; and setting a division point for dividing the video content on a time axis using at least one or more parameters of the color change amount, the text data, and the character information as a feature amount, it is possible to accurately determine the division point of the video content, and the digest video that is edited by connecting cut videos can be edited into a video that will not give a sense of incongruity.

Furthermore, in a case where the step of calculating the color change amount includes the steps of: dividing representative frame images that are temporally preceding and following in the video content into a plurality of image regions and calculating an RGB change amount of a pixel in each image region of the representative frame images; calculating a hue shift average in predetermined adjacent hue regions on a color circle for the representative frame images; and calculating the color change amount on a basis of the RGB change amount and the hue shift average, a color change is determined on the basis of at least two parameters of the RGB change amount and the hue shift average. Thus, erroneous detection of the division point can be prevented, the division point can be reliably detected, and a video without a sense of incongruity can be edited.

Furthermore, in a case where the step of creating the scene videos includes the steps of: determining commonality of context of each cut video on a basis of morphological analysis for each word of the text data; detecting a desired object displayed in the video content and determining presence or absence of movement of the object in each cut video; extracting character information included in the video content on a basis of OCR analysis and determining commonality of the character information of each cut video; and classifying the cut video into one of the plurality of attribute groups on a basis of at least one of commonality of the context, presence or absence of movement of the object, or commonality of the character information, the cut videos can be accurately classified into the attributes of the scene videos that are classified in advance on the basis of each element of the character information according to the text data based on the morphological analysis, object detection, and OCR analysis.

Furthermore, in a case where the step of selecting the cut videos includes the steps of: determining whether a sound volume level of the video content is equal to or greater than a predetermined threshold; determining whether an expression of a performer of the video content is in a specific state; determining whether a word uttered by a performer of the video content is a specific term; and selecting a desired cut video from a content section in which the sound volume level is equal to or greater than a predetermined threshold, a content section in which the expression of the performer is in a specific state, and a content section in which the performer utters a specific term, the cut video having the best appearance for the viewers can be selected from the plurality of cut videos classified into desired scene videos.

Effects of Invention

A video editing device, a video editing program, and a video editing method according to the present invention can efficiently create a digest video obtained by collecting scenes in which a viewer will show interest.

BRIEF DESCRIPTION OF DRAWINGS

FIG. 8 is a diagram illustrating an example of a framework of a digest video prepared in advance.

DESCRIPTION OF EMBODIMENTS

Hereinafter, embodiments of the present invention relating to a video editing device, a video editing program, and a video editing method will be described with reference to the drawings, and are provided for understanding of the present invention.

Figure 1:
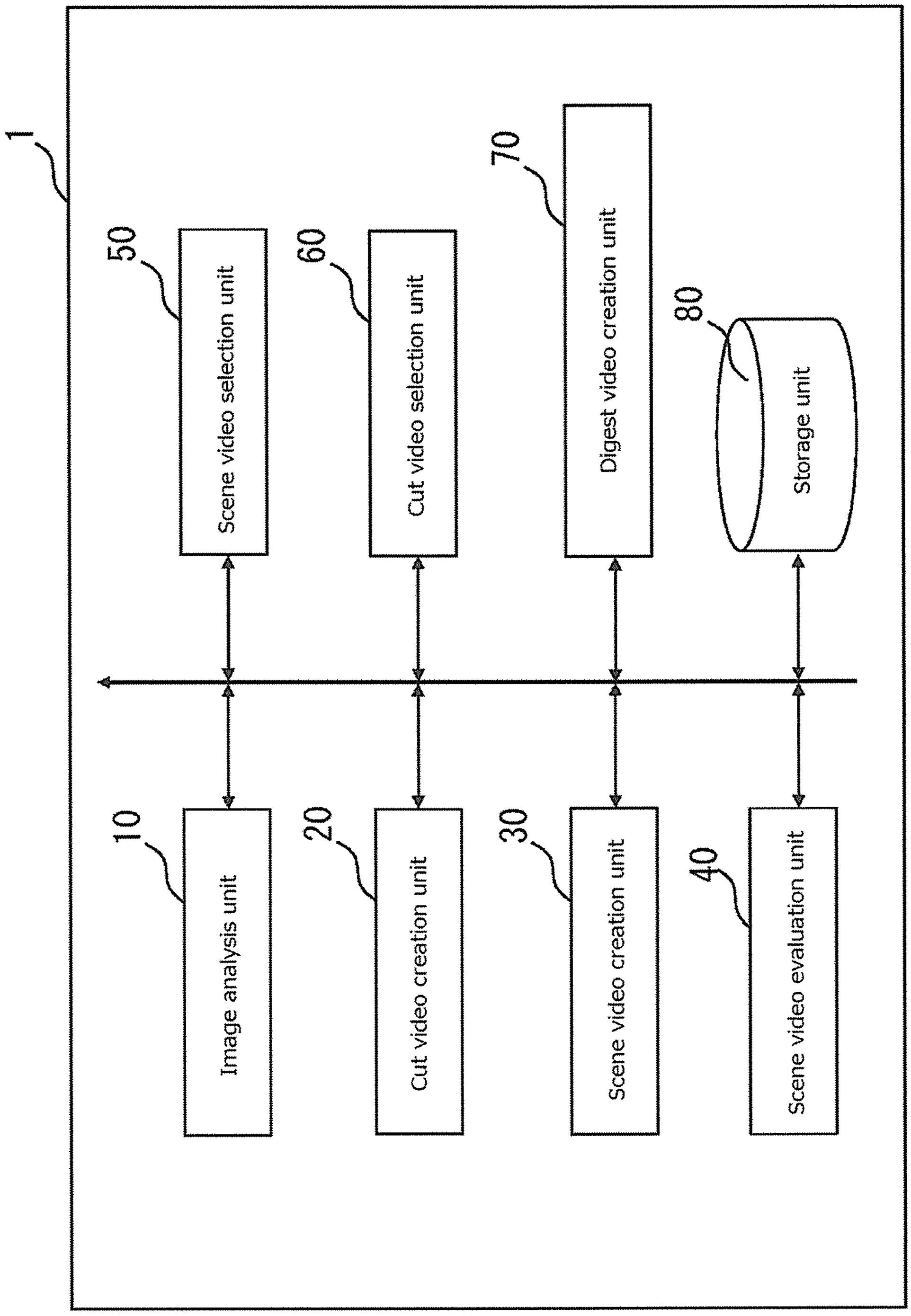
FIG. 1 is a diagram illustrating an overall configuration of a video editing device according to an embodiment of the present invention.

First, an overall configuration of a video editing device 1 according to an embodiment of the present invention will be described with reference to FIG. 1. The video editing device 1 according to the embodiment of the present invention is mainly configured with an image analysis unit 10, a cut video creation unit 20, a scene video creation unit 30, a scene video evaluation unit 40, a scene video selection unit 50, a cut video selection unit 60, a digest video creation unit 70, and a storage unit 80.

1 Image Analysis Unit

Figure 2:
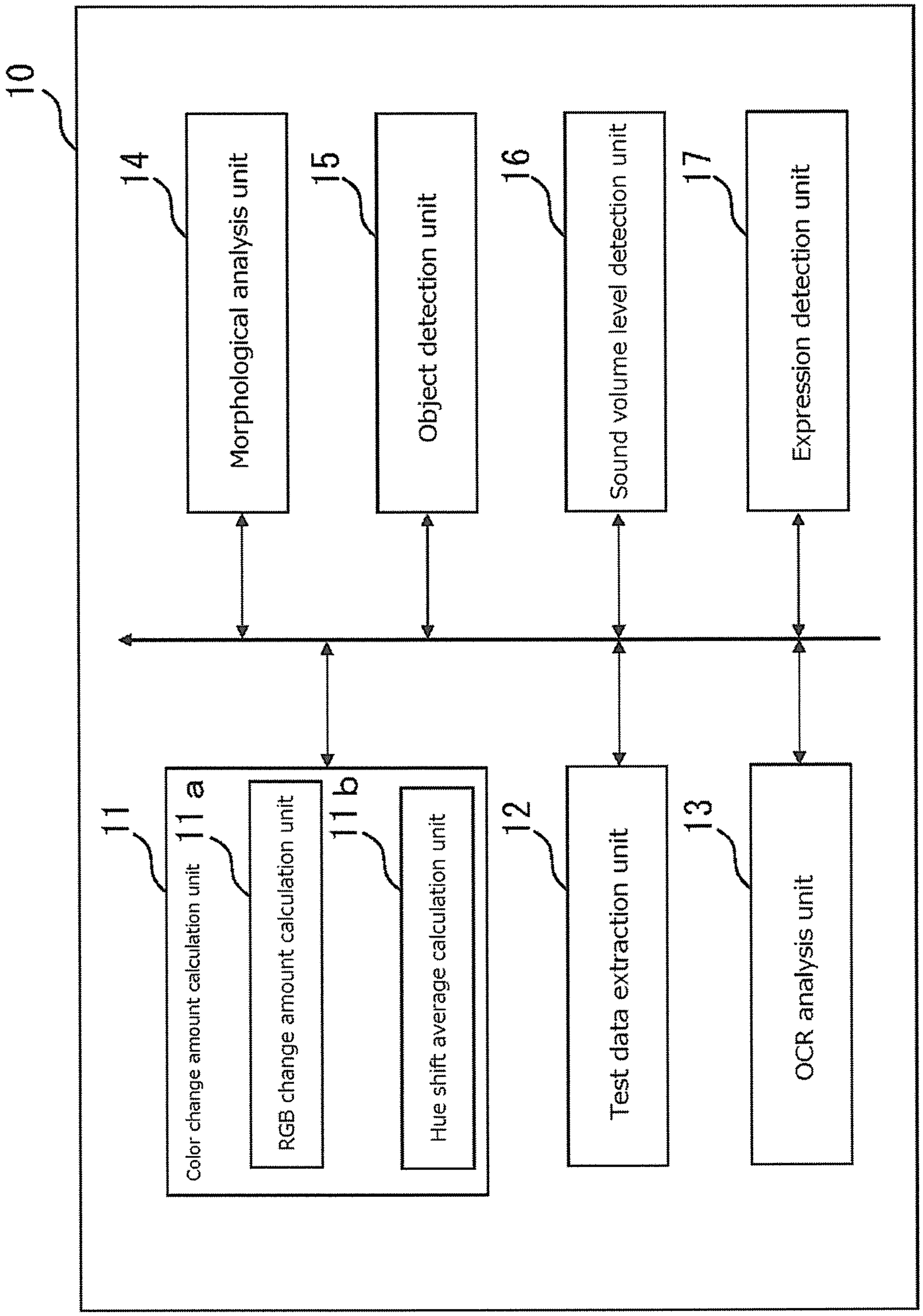
FIG. 2 is a diagram illustrating an overall configuration of an image analysis unit.

The image analysis unit 10 has the configuration illustrated in FIG. 2, and has a function of performing image analysis on full-length video content serving as the original material of a digest video. The image analysis unit 10 mainly has the following configuration.

[Color Change Amount Calculation Unit]

A color change amount calculation unit 11 has a function of calculating a color change amount of temporally preceding and following frame images of the video content whose image is reduced by a predetermined amount, and extracting a frame image whose color change amount exceeds a predetermined value as a division point indicating switching of the video, and includes an RGB change amount calculation unit 11*a* and a hue shift average calculation unit 11*b*. The RGB change amount calculation unit 11*a* calculates RGB values (0 to 255) of pixels at the same position in the preceding and following frame images that are divided into a plurality of pixels (image regions), identifies a pixel in which the following frame is changed by a predetermined threshold (for example, 20%) or more as compared with the preceding frame, counts this pixel as a changed pixel and as one count, and extracts a frame image in which the number of counts of the RGB change amount of the entire screen is equal to or greater than a predetermined number.

Here, the threshold of the color change amount of the preceding and following frames is not necessarily limited to 20%, and the threshold can be freely selected. In addition, it is not always necessary to adopt a reduced image as a frame image for comparison. However, by adopting a reduced image as the frame image for comparison, the sensitivity to a minute color change in the frame image can be lowered, which makes it possible to prevent excessive determination of switching of the video.

In addition, the hue shift average calculation unit 11*b* obtains the content of each color in preceding and following frame images of the video content on the basis of a well-known color circle indicating the continuous hue change of 360 colors, further classifies 360 colors in the color circle into adjacent 16 color regions, and calculates the shift average of the 16 colors. Then, for each color of the calculated shift average, the count number of the hue change of the entire screen is calculated by comparing the preceding and following frames and counting colors exhibiting a predetermined change amount, and the presence or absence of switching of the video is determined on the basis of the determination of whether the count number is equal to or greater than a threshold.

Here, in the calculation of the hue shift average, it is not always necessary to calculate the shift average of the adjacent regions of 16 colors classified in the color circle. However, as described above, from the viewpoint of preventing excessive determination of switching of the video, it is preferable to calculate not only the content of each color on the basis of the color circle but also the shift average of the hues of the adjacent predetermined regions in order to alleviate the spike of each color and small changes in hue.

Figure 4:
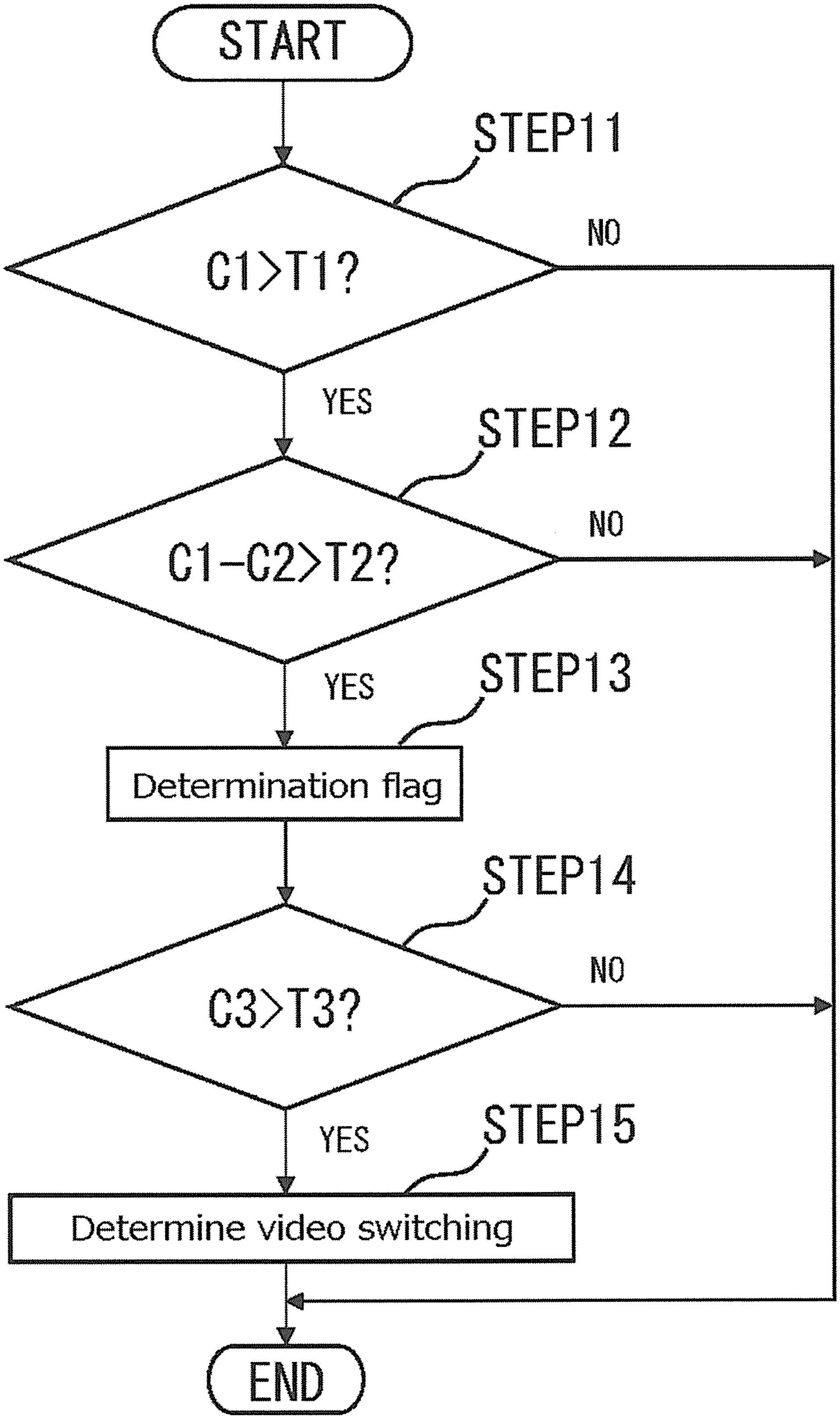
FIG. 4 is a processing flowchart of a color change amount calculation unit.

The determination of the switching of the video on the basis of the color change amount calculated by the color change amount calculation unit 11 is made, for example, according to the flow illustrated in FIG. 4. First, it is determined whether an RGB change amount C1 of the preceding and following frame images calculated by the RGB change amount calculation unit 11*a* is equal to or greater than a first threshold T1 (for example, 24%) (STEP 11).

If it is determined in STEP 11 that the RGB change amount C1 is equal to or greater than first threshold T1, it is determined whether a value obtained by subtracting an average value C2 of the RGB change amounts at a predetermined time from the RGB change amount C1 is equal to or greater than a second threshold T2 (for example, 20%) (STEP 12). In the case of "YES" in STEP 12, it is determined that RGB change amount C1 of the preceding and following frame images is large, and the determination flag of the video switching is set (STEP 13).

Furthermore, it is determined whether a hue shift average C3 calculated by the hue shift average calculation unit 11*b* exceeds a third threshold T3 (STEP 14). If it is determined that the color shift average C3 is equal to or greater than the third threshold T3, it is determined that the color component has greatly changed, and it is determined that the video is switched (STEP 15). If it is determined as "NO" in all of STEP 11, STEP 12, and STEP 14, it is determined that the color change amount is small and the video is not switched, and the process is ended.

As described above, by determining the switching of the video on the basis of the color change amount on the basis of both the RGB change amount and the color shift average, for example, in a case where an image is captured by combining zooming, panning, or tilting of the camera as a capturing method of the image in the video content, the RGB change amount of the preceding and following frame images temporarily changes significantly, but in a case where the threshold is not reached on the basis of the hue shift average, it is not determined that the video is switched, so that it is possible to prevent excessive determination of switching of the video in advance.

[Text Data Extraction Unit]

Figure 5:
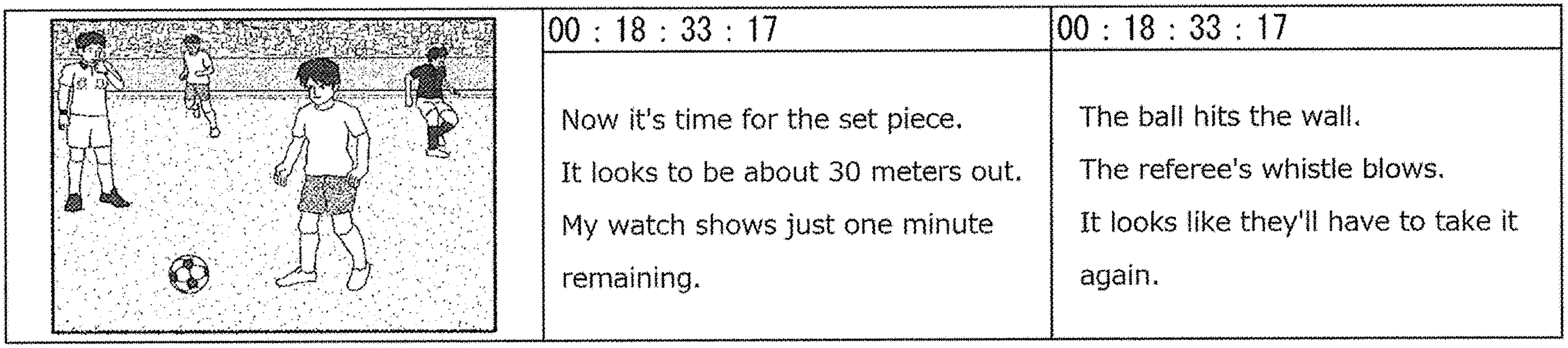
FIG. 5 is a diagram illustrating an example of text data extracted by a text data extraction unit.

A text data extraction unit 12 includes a voice recognition engine (not illustrated) that recognizes the voice of a performer of the video content (the voice of the commentator in a case of a sports relay broadcast), and has a function of transcribing the voice output from the video content, that is, converting voice data into text data. As illustrated in FIG. 5, the text data extracted through transcription is associated with a cut video of the video content and stored in the storage unit 80 together with the time code. The text data is used for, for example, morphological analysis in a morphological analysis unit 14, which will be described later, and determination of video switching is performed.

[OCR Analysis Unit]

An OCR analysis unit 13 has a function of recognizing, by OCR analysis, the whole information of characters and numerals displayed on the screen, such as character information displayed in the video content, for example, character information displayed on a flip chart used by a performer in the video content to present explanation to the viewers, or information displayed as a superimposed text displayed in the video content (subtitle information including player information and game scores in a case of a sports program), and storing the information in the storage unit 80 as text data.

[Morphological Analysis Unit]

The morphological analysis unit 14 performs morphological analysis on the character information extracted by the text data extraction unit 12, and stores the analysis result in the storage unit 80. For example, the morphological analysis unit 14 divides character information into morpheme units, and estimates a part of speech, conjugation form, or the context of each sentence for each morpheme. Then, the morphological analysis unit 14 stores, for each morpheme, a morphological analysis result including a character string segmented into morpheme units and information such as the estimated part of speech, conjugation form, and the like in the storage unit 80.

In the storage unit 80, words such as "now," "then," "well," "next," "so," and "meanwhile," which are often used at the time of video switching, or words such as "yes," "I think," and "thank you," which are often used at the end of the sentence immediately before the video scene is switched, are registered in advance. In a case where these words are included at the beginning or the end of the sentence as the result of the morphological analysis by the morphological analysis unit 14, it is determined that there is a high possibility that the video scene has been switched, which makes it possible to prevent the determination of the switching of the video scene from being made at an unnatural point.

[Object Detection Unit]

An object detection unit 15 performs object detection for each of subjects included in a frame image acquired from the video content. In the object detection by the object detection unit 15, an object detection model prepared in advance is stored in the storage unit 80, and the detected object detected by the object detection unit 15 is identified by comparing the object with the object detection model stored in the storage unit 80. Then, the object detection model is updated as needed by, for example, an image learning device (not illustrated).

The object detection unit 15 is also used in the OCR analysis described above. First, the object detection unit 15 detects character information displayed in the video content that is a target object to be subjected to OCR analysis on the basis of machine learning. For example, for recognition of a flip chart displayed in the video content, the shapes and sizes of flip charts that are generally used are registered as data in advance, and when the data registered in advance and the shape and the size of an object displayed in the video match, it is determined that the object is a flip chart, and character information displayed on the flip chart can be subjected to OCR analysis by the OCR analysis unit 13.

In addition, the object detection unit 15 detects another object (for example, in a case where the video content is a sports relay broadcast, a competitor introduced in the content) displayed in the video content, and detects the competitor appearing in the video content after matching with the competitor information that is registered in advance. Then, it can be determined that there is no switching of the video while the detected competitor is displayed in the video content, whereas in a case where a different competitor is detected, it can be determined that there is switching of the video or switching of the video scene.

[Sound Volume Level Detection Unit]

A sound volume level detection unit 16 detects sound output from the video content, and recognizes the sound volume level. According to the sound volume level detected by the sound volume level detection unit 16, for example, a scene in which the sound volume level exceeds a predetermined threshold in the video content can be determined to be particularly a highlight scene. Note that the sound volume level detection unit 16 may be incorporated in the text data extraction unit 12 and configured to detect the sound volume level on the basis of the voice recognition engine of the text data extraction unit 12.

[Expression Detection Unit]

An expression detection unit 17 has a function of detecting a face portion of a human who is a performer appearing in the video content and detecting its expression. In the detection of the expression by the expression detection unit 17, similarly to the object detection unit 15, multiple human expression models prepared in advance are registered, the movement of each part of the face is detected, the human emotion is classified into, for example, joy, anger, sorrow, pleasure, surprise, fear, and blankness, and the expression analysis of that human can be performed. As a result, it is possible to extract a cut video having the best looking expression for the viewers.

2 Cut Video Creation Unit

The cut video creation unit 20 has a function of identifying a switching point (division point) of the video of the video content serving as the original material on the basis of the analysis result of the image analysis unit 10 described above, and dividing the video content into a plurality of cut videos on the basis of the identified division points.

Figure 3:
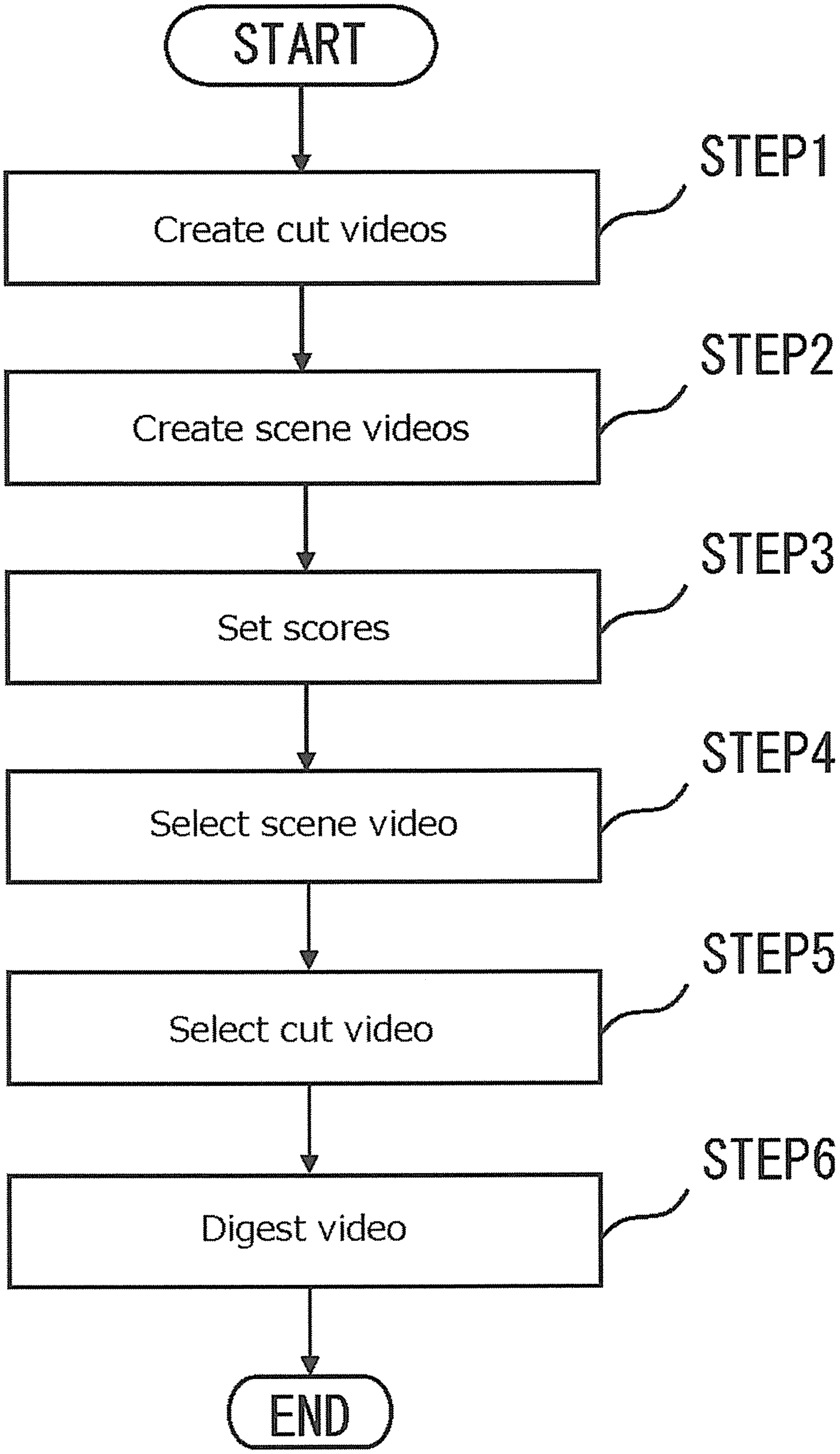
FIG. 3 is a flowchart of a video editing method according to an embodiment of the present invention.
Figure 6:
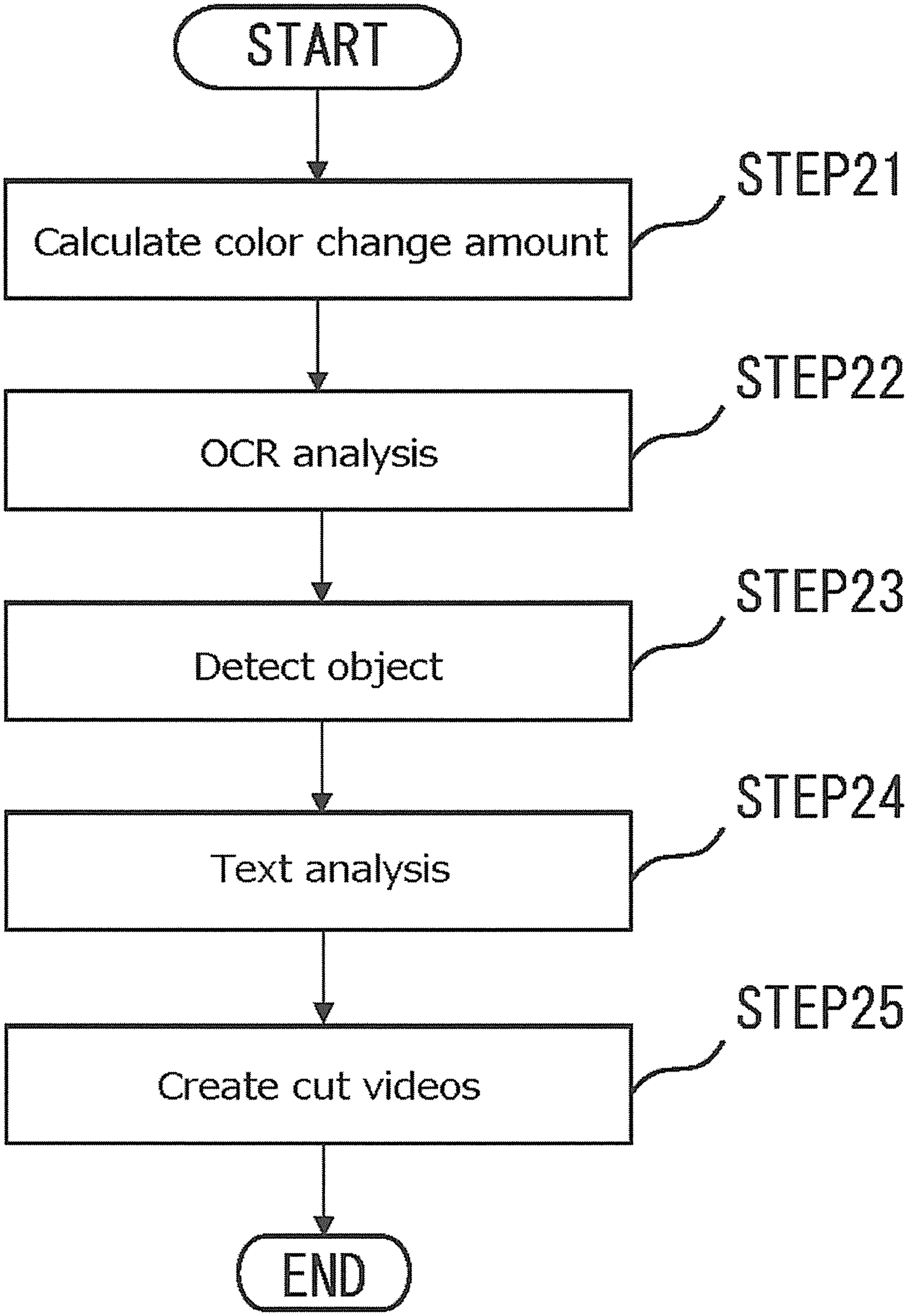
FIG. 6 is a processing flowchart of a cut video creation unit.

Creation of the cut video is calculated on the basis of the flow of FIG. 6. First, the color change amount calculation unit 11 calculates the color change amount of the extracted preceding and following frame images, and sets division points at which the color change amount is equal to or greater than a predetermined value (STEP 21). Note that the calculation processing by the color change amount calculation unit 11 is calculated on the basis of the flow of FIG. 3 described above.

When the color change amount is equal to or greater than the predetermined value, more detailed division points are set on the basis of OCR analysis by the OCR analysis unit 13 (STEP 22), object detection by the object detection unit 15 (STEP 23), and text analysis by the text data extraction unit 12 (STEP 24), and cut videos are created (STEP 25). That is, the division points are approximately set by the color change amount calculation unit 11, and the fore-and-aft positions of the fore- and aft positions of the division points are adjusted by OCR analysis, image analysis on the basis of object detection, and text analysis, so that it is possible to prevent the division points from being set as switching points of an incomplete scene.

Note that the division points for creating the cut video can be set on the basis of the color change amount, but it is preferable to set the division points by OCR analysis, image analysis on the basis of object detection, and further text analysis in order to prevent unnatural connection between before and after each cut video in the edited digest video.

3 Scene Video Creation Unit

Figure 7:
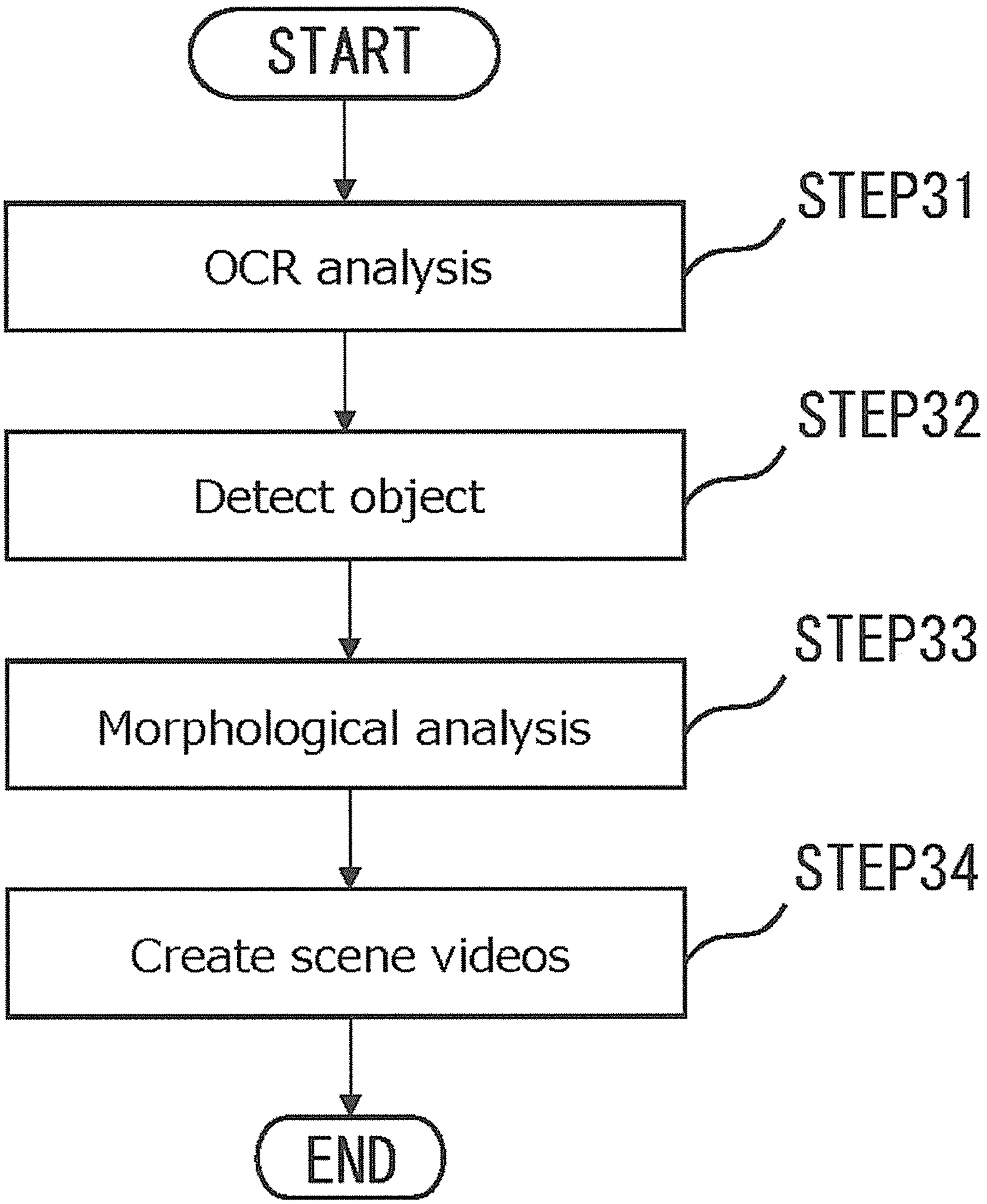
FIG. 7 is a processing flowchart of a scene video creation unit.

The scene video creation unit 30 has a function of determining a scene change of the video content serving as the original material by image analysis by the image analysis unit 10, classifying the video content into a plurality of attribute groups (a plurality of content sections according to the program configuration of the video content) segmented by time zones, allocating the cut videos created by the cut video creation unit 20 into the classified attribute groups, and creating a group of scene videos. The creation of a scene video by the scene video creation unit 30 is processed on the basis of the flow illustrated in FIG. 7.

First, character information displayed on a flip chart or the like, which is displayed in the video content, is analyzed through OCR analysis by the OCR analysis unit 13, and it is determined whether they can be grouped as a scene video of a content section of one group (STEP 31). Specifically, the presence or absence of a change in the character information extracted by the OCR analysis over time is determined, and the cut videos during the time in which the character information does not change are classified into predetermined content sections as a group of scene videos.

Next, the object detection unit 15 detects an object (for example, a performer, an exercise tool, a building, or the like) in the image shown in the video content, and determines whether they can be grouped as a scene video of a content section of one group (STEP 32). When the object in the image does not change for a certain period, the cut videos in this period are classified into a predetermined content section as a scene video of one group.

Then, it is determined whether they can be contextually grouped as a group of scene images on the basis of the text data extracted through transcription by the text data extraction unit 12 and the morphological analysis by the morphological analysis unit 14 (STEP 33).

On the basis of the above-described processing, the cut videos created by the cut video creation unit 20 are classified into preset content sections, and a group of scene videos is created (STEP 34).

Note that the creation of the scene video does not need to be determined on the basis of the three elements of the OCR analysis by the OCR analysis unit 13, the object detection by the object detection unit 15, and the text data extracted by the text data extraction unit 12, and any one or a combination of two may be used for creation.

4 Scene Video Evaluation Unit

The scene video evaluation unit 40 has a function of setting a score for each of a group of attribute groups (scene videos) made up of a plurality of content sections created by the scene video creation unit 30. In the setting of the score, a score weighted under a predetermined condition is given to each scene video.

In the score setting by the scene video evaluation unit 40, first, the editor selects the framework of a digest video to be edited. In this framework, in a case where the video content serving as the original material of the digest video to be edited is a sports relay broadcast, as illustrated in FIG. 8, a desired one is selected from the templates of scene videos prepared in advance according to the time of the digest video to be edited, such as 10 minutes (longer highlights), 5 minutes (shorter highlights), 3 minutes (more scoring scenes), and 3 minutes (scoring scenes only).

For example, in a case where "10 minutes (longer highlights)" is selected as the framework of the digest video, a series of content sections, starting from "opening" followed by "player introduction," "scoring scene 1," "state of spectators," "scoring scene 2," and "player-of-the-game interview," are set as its program configuration.

Then, the score setting for each scene video can be freely set in the framework of the selected scene videos. For example, in a case where a template of a program configuration having a relatively long time is selected, weighting is set such that scores are uniformly assigned to each scene video. In contrast, in a case where a framework of a program configuration having a relatively short time and many scoring scenes is selected, weighting is set such that the scene video of a scoring scene has a high score.

In addition, it is possible to set the scores by increasing the weighting for a scene video that has a greater audience rating data at the time of broadcasting the video content serving as the original material or has caused many reactions from viewers through SNS. Furthermore, the scores can be set by increasing the weighting for a scene video in a time zone that is likely to be adopted as a digest video according to the video content on the basis of the past viewing data (for example, in the case of a sports relay broadcast, a time zone immediately after the start of the game or a time zone in the final stage close to the end time of the game).

5 Scene Video Selection Unit

The scene video selection unit 50 has a function of selecting a scene video to be adopted as a digest video on the basis of the evaluation result by the scene video evaluation unit 40 described above. Specifically, for the framework of the digest video to be edited, a scene video having a high score is selected from the score values set by the scene video evaluation unit 40 and stored in the storage unit 80.

6 Cut Video Selection Unit

The cut video selection unit 60 selects a desired cut video to be adopted for the digest video from the cut videos included in the scene video selected by the scene video selection unit 50. The selection of the cut video is freely made according to the result extracted or detected by the text data extraction unit 12, the sound volume level detection unit 16, and the expression detection unit 17 described above.

For example, in the text data extraction unit 12, a cut video in which pre-registered positive words (for example, "awesome," "beautiful," "goal," "home run," and the like) are used in the words uttered by a performer is preferentially selected. Furthermore, among the sound volumes detected by the sound volume level detection unit 16, a cut video having a particularly high volume due to cheers or applause of the spectators is preferentially selected. Furthermore, the cut video having a good expression of a performer is preferentially selected by the expression detection unit 17.

As described above, since the cut video that will be most attractive is selected from the scene videos on the basis of the text data, the sound volume, the expression, and the like, it is possible to edit a digest video that will leave an impression on the viewers even in a short time.

7 Digest Video Creation Unit

The digest video creation unit 70 has a function of connecting cut videos extracted from the selected scene videos to create a digest video according to a purpose. In particular, when only the cut videos that will leave an impression on the viewers are connected by the above-described cut video selection unit 60, the connection between the scene videos may become unnatural. In order to solve this problem, in the digest video creation unit 70, a cut video that prevents the context connection of preceding and following cut videos from becoming unnatural is inserted using morphological analysis, for example, so that it is possible to edit a digest video without a sense of incongruity as a whole.

The above is the main configuration of the video editing device 1. Next, a video editing method according to an embodiment of the present invention realized in the video editing device 1 will be described with reference to a flowchart of FIG. 2. Note that the video editing device 1 executes the processing illustrated in the drawing according to a program.

First, the cut video creation unit 20 creates cut videos by dividing video content serving as the original material on the basis of a predetermined dividing condition (STEP 1). Note that the cut videos are created according to the flows of FIGS. 4 and 6 described above.

The cut videos created in STEP 1 are classified into a plurality of attribute groups prepared in advance, and a group of scene videos is created by the scene video creation unit 30 (STEP 2). Note that the scene videos are created according to the flow of FIG. 7 described above. Then, a score is set to each of the created scene videos by the scene video evaluation unit 40 (STEP 3), and a desired scene video is selected on the basis of the score value (STEP 4).

Next, the cut video selection unit 60 selects a cut video that will be most attractive as a video from the cut videos included in the scene video (STEP 5), and the digest video creation unit 70 creates a digest video by connecting the cut videos and inserting an appropriate cut video so as not to form an unnatural video (STEP 6).

Although the video editing device, the video editing program, and the video editing method according to the embodiments of the present invention have been described above, the technical scope of the present invention is not limited to the above-described embodiments, and various inventions can be made by appropriately combining a plurality of components disclosed in the above-described embodiments without departing from the gist of the present invention.

For example, in the above-described embodiment, the scene video creation unit 30, the scene video evaluation unit 40, the scene video selection unit 50, and the cut video selection unit 60 have independent configurations. However, the scene video creation unit 30, the scene video evaluation unit 40, and the scene video selection unit 50 may each be included in the cut video selection unit 60, or some components may be deleted from the components described in other embodiments.

As described above, a video editing device, a video editing program, and a video editing method according to the present invention are capable of efficiently creating a digest video obtained by collecting scenes in which a viewer will show interest.

REFERENCE SIGNS LIST

1: Video editing device
10: Image Analysis Unit
11: Color change amount calculation unit
11*a*: RGB change amount calculation unit
11*b*: Hue shift average calculation unit
12: Text data extraction unit
13: OCR analysis unit
14: Morphological analysis unit
15: Object detection unit
16: Sound volume level detection unit
17: Expression detection unit
20: Cut Video Creation Unit
30: Scene video creation unit
40: Scene video evaluation unit
50: Scene Video Selection Unit
60: Cut video selection unit
70: Digest Video Creation Unit
80: Storage unit

The invention claimed is:

1. A video editing device comprising:

an image analysis unit configured to perform image analysis of video content serving as an original material;

a cut video creation unit configured to create cut videos by dividing the video content at a predetermined division point on a basis of an analysis result of the image analysis unit;

a cut video selection unit configured to select desired cut videos from the cut videos on the basis of the analysis result of the image analysis unit;

a scene video creation unit configured to create scene videos by classifying the cut videos into a plurality of attribute groups that are prepared in advance;

a scene video evaluation unit configured to evaluate the scene videos by setting a score for each of the scene videos by weighting according to a predetermined parameter indicating a degree of attention from a viewer in each scene video of the video content and a time segment corresponding to a prearranged program configuration of the video content;

a scene video selection unit configured to select a desired scene video from the scene videos on a basis of the scores set by the scene video evaluation unit; and a digest video creation unit configured to create a digest video that has a shorter video time length than the video content by connecting the desired cut videos selected from a plurality of the cut videos included in the scene video selected by the scene by the scene video selection unit.

2. The video editing device according to claim 1, wherein the image analysis unit includes:

a color change amount calculation unit configured to calculate a color change amount between frame images of the video content; a text data extraction unit configured to recognize audio data included in the video content and extract the audio data as text data; and an OCR analysis unit configured to extract character information included in the video content, and the cut video creation unit is configured to set a division point for dividing the video content on a time axis using at least one or more parameters of the color change amount, the text data, and the character information as a feature amount.

3. The video editing device according to claim 2, wherein the color change amount calculation unit includes:

an RGB change amount calculation unit configured to divide representative frame images that are temporally preceding and following in the video content into a plurality of image regions and calculate an RGB change amount of a pixel in each image region of the representative frame images; and a hue shift average calculation unit configured to calculate a hue shift average in predetermined adjacent hue regions on a color circle for the representative frame images, and the color change amount calculation unit is configured to calculate the color change amount on a basis of the RGB change amount and the hue shift average.

4. The video editing device according to claim 2, wherein the image analysis unit further includes:

a morphological analysis unit configured to perform morphological analysis on the text data extracted by the text data extraction unit for each word; and an object detection unit configured to detect a desired object displayed in the video content, and the scene video creation unit is configured to classify the cut video into one of the plurality of attribute groups on a basis of at least one of commonality of context based on morphological analysis by the morphological analysis unit, commonality of character information based on OCR analysis by the OCR analysis unit, and presence or absence of movement of an object based on object detection by the object detection unit.

5. The video editing device according to claim 1, wherein a plurality of content sections that include an opening section indicating content of an opening portion of the video content and correspond to a program configuration of the video content are stored as the attribute groups, and the scene video creation unit is configured to classify the cut video into one of the plurality of content sections on a basis of content of the cut video.

6. The video editing device according to claim 2, wherein the image analysis unit further includes:

a sound volume level detection unit configured to detect a sound volume level of the video content; and an expression detection unit configured to detect an expression of a performer of the video content, and the cut video selection unit is configured to select a desired cut video from a content section in which a sound volume of the video content detected by the sound volume level detection unit exceeds a predetermined threshold, a content section in which an expression of a performer of the video content detected by the expression detection unit is in a specific state, or a content section in which a performer of the video content utters a specific term on a basis of text data extracted by the text data extraction unit.

7. A non-transitory computer readable medium storing a video editing program that causes a computer to execute a process, the process comprising:

creating cut videos by dividing video content serving as an original material on a basis of a predetermined division condition;

creating scene videos by classifying the cut videos into a plurality of attribute groups prepared in advance;

evaluating the scene videos by setting a desired score for each of the scene videos by weighting according to a predetermined parameter indicating a degree of attention from a viewer in each scene video of the video content and a time segment corresponding to a prearranged program configuration of the video content;

selecting a desired scene video from the scene videos on a basis of the scores;

selecting desired cut videos from a plurality of the cut videos included in the scene video; and creating a digest video having a shorter video time length than the video content by connecting the desired cut videos selected in the step of selecting the desired cut videos.

8. The non-transitory computer readable medium according to claim 7, wherein the step of creating the cut videos includes the steps of:

calculating a color change amount between frame images of the video content;

recognizing audio data included in the video content and extracting the audio data as text data;

extracting character information included in the video content; and setting a division point for dividing the video content on a time axis using at least one or more parameters of the color change amount, the text data, and the character information as a feature amount.

9. The non-transitory computer readable medium according to claim 8, wherein the step of calculating the color change amount includes the steps of:

dividing representative frame images that are temporally preceding and following in the video content into a plurality of image regions and calculating an RGB change amount of a pixel in each image region of the representative frame images;

calculating a hue shift average in predetermined adjacent hue regions on a color circle for the representative frame images; and calculating the color change amount on a basis of the RGB change amount and the hue shift average.

10. The non-transitory computer readable medium according to claim 8, wherein the step of creating the scene videos includes the steps of:

determining commonality of context of each cut video on a basis of morphological analysis for each word of the text data;

detecting a desired object displayed in the video content and determining presence or absence of movement of the object in each cut video;

extracting character information included in the video content on a basis of OCR analysis and determining commonality of the character information of each cut video; and classifying the cut video into one of the plurality of attribute groups on a basis of at least one of commonality of the context, presence or absence of movement of the object, and commonality of the character information.

11. The non-transitory computer readable medium according to claim 7, wherein the step of selecting the desired cut videos includes the steps of:

determining whether a sound volume level of the video content is equal to or greater than a predetermined threshold;

determining whether an expression of a performer of the video content is in a specific state;

determining whether a word uttered by a performer of the video content is a specific term; and selecting a desired cut video from a content section in which the sound volume level is equal to or greater than a predetermined threshold, a content section in which the expression of the performer is in a specific state, and a content section in which the performer utters a specific term.

12. A video editing method comprising the steps of:

creating cut videos by dividing video content serving as an original material on a basis of a predetermined division condition;

creating scene videos by classifying the cut videos into a plurality of attribute groups prepared in advance;

evaluating the scene videos by setting a desired score for each of the scene videos by weighting according to a predetermined parameter indicating a degree of attention from a viewer in each scene video of the video content and a time segment corresponding to a prearranged program configuration of the video content;

selecting a desired scene video from the scene videos on a basis of the scores;

selecting desired cut videos from a plurality of the cut videos included in the scene video; and creating a digest video having a shorter video time length than the video content by connecting the desired cut videos selected in the step of selecting the desired cut videos.

* * * * *